US008591323B2

(12) United States Patent
Roukis

(10) Patent No.: US 8,591,323 B2
(45) Date of Patent: Nov. 26, 2013

(54) GAMING MACHINE INCLUDING A FEATURE GAMBLE

(71) Applicant: Aristocrat Technologies Australia Pty Limited, North Ryde (AU)

(72) Inventor: George Roukis, Miranda (AU)

(73) Assignee: Aristocrat Technologies Australia Pty Ltd (AU)

( * ) Notice: Subject to any disclaimer, the term of this patent is extended or adjusted under 35 U.S.C. 154(b) by 0 days.

(21) Appl. No.: 13/692,312

(22) Filed: Dec. 3, 2012

(65) Prior Publication Data

US 2013/0123001 A1 May 16, 2013

Related U.S. Application Data

(63) Continuation of application No. 12/843,507, filed on Jul. 26, 2010, now Pat. No. 8,337,299, which is a continuation of application No. 12/617,193, filed on Nov. 12, 2009, now abandoned, which is a continuation of application No. 10/840,875, filed on May 7, 2004, now Pat. No. 7,637,808.

(30) Foreign Application Priority Data

May 7, 2003 (AU) ................................ 2003902183

(51) Int. Cl.
*A63F 13/00* (2006.01)

(52) U.S. Cl.
USPC .................................. 463/26; 463/20; 463/31

(58) Field of Classification Search
USPC .......................................... 463/16, 20, 26, 31
See application file for complete search history.

(56) References Cited

U.S. PATENT DOCUMENTS

| | | | | |
|---|---|---|---|---|
| 6,117,010 | A | 9/2000 | Canterbury et al. | |
| 6,375,187 | B1 | 4/2002 | Baerlocher | |
| 6,569,015 | B1 | 5/2003 | Baerlocher et al. | |
| 6,599,192 | B1 | 7/2003 | Baerlocher et al. | |
| 6,648,754 | B2 * | 11/2003 | Baerlocher et al. | 463/17 |
| 6,786,820 | B2 | 9/2004 | Gerrard et al. | |
| 7,192,349 | B2 | 3/2007 | Baerlocher et al. | |
| 2002/0052232 | A1 | 5/2002 | Kaminkow | |
| 2002/0155883 | A1 | 10/2002 | Baerlocher | |
| 2003/0064795 | A1 | 4/2003 | Baerlocher et al. | |
| 2003/0078093 | A1 | 4/2003 | Simms et al. | |
| 2003/0166410 | A1 | 9/2003 | Olive | |
| 2003/0211879 | A1 * | 11/2003 | Englman | 463/20 |
| 2004/0048646 | A1 * | 3/2004 | Visocnik | 463/16 |
| 2004/0048649 | A1 | 3/2004 | Peterson et al. | |

OTHER PUBLICATIONS

Examiner's first report corresponding to Australian Patent Application No. 2004201852, dated Mar. 18, 2009.

* cited by examiner

*Primary Examiner* — James S McClellan
(74) *Attorney, Agent, or Firm* — McAndrews, Held & Malloy, Ltd.

(57) ABSTRACT

A gaming machine has a display and a game controller arranged to control images of symbols displayed on the display. The game controller is arranged to play a game wherein at least one random event is caused to be displayed on the display and, if a predefined winning event occurs, the machine awards a prize. A game has a feature having non-monetary characteristics which can be won, the non-monetary characteristics being able to be gambled. The gaming machine includes a selector by which a player is able to gamble at least one of the non-monetary characteristics of the feature.

12 Claims, 7 Drawing Sheets

GAMING MACHINE INCLUDING A FEATURE GAMBLE

CROSS-REFERENCE TO RELATED APPLICATIONS

The present patent application is a continuation application of U.S. application Ser. No. 12/843,507, filed Jul. 26, 2010, now U.S. Pat. No. 8,337,299, which is a continuation of application Ser. No. 12/617,193, filed Nov. 12, 2009, now abandoned, which is a continuation of U.S. application Ser. 10/840,875, filed May 7, 2004, now U.S Pat. No. 7,637,808, which claims priority to AU application 2003902183, filed May 7, 2003. The present patent application incorporates each of the above identified applications by reference in their entirety.

FIELD OF THE INVENTION

This invention relates to a gaming machine. More particularly, the invention relates to a gaming machine and to an improvement to a game played on such a gaming machine.

BACKGROUND OF THE INVENTION

Players who regularly play gaming machines quickly tire of particular games and therefore it is necessary for manufacturers of these machines to develop innovative game features which add interest to the games. In so doing, it is hoped to keep players amused and therefore willing to continue playing the game as well as to attract new players.

Also, with the growth that has occurred in the gaming machine market, there is intense competition between manufacturers to supply various existing and new venues. When selecting a supplier of gaming machines, the operator of a venue will often pay close attention to the popularity of various games with their patrons. Therefore, gaming machine manufacturers are keen to devise games and/or game features which are popular with the players as a mechanism for improving sales, retaining customers and attracting new customers.

SUMMARY OF THE INVENTION

According to a first aspect of the invention, there is provided a gaming machine having a display and a game controller arranged to control images of symbols displayed on the display, the game controller being arranged to play a game wherein at least one random event is caused to be displayed on the display and, if a predefined winning event occurs, the machine awards a prize, the gaming machine further comprising a game in which a feature having non-monetary characteristics can be won, the non-monetary characteristics being able to be gambled and the gaming machine including a selector by which a player is able to gamble at least one of the non-monetary characteristics of the feature.

In this specification, the term "gamble" or "gambled" is to be understood as enabling a player to attempt to improve one or more of the non-monetary characteristics of the feature at the risk of being placed in a worse position. Preferably, the player is not required to bet an additional amount in order to be eligible for the ability to gamble the non-monetary characteristics of the feature.

The non-monetary characteristics of the feature may be selected from the group including, but not necessarily consisting exclusively of, a number of free games constituting the feature, a multiplier applied to prizes won during the feature, a number of paylines applicable to games in a feature, a jackpot category, an amount of partial or total re-spins in a feature, a number of player selections available to a player in the feature.

The feature may be won by the occurrence of a predetermined trigger condition in an underlying base game of the game. For example, in the case of a spinning reel base game, the feature may be triggered upon the occurrence of a predetermined symbol or combination of symbols. The combination of symbols may be the occurrence of a predetermined number of scatter symbols on the display means. For example, a feature comprising a number of free games may be awarded when at least three scatter symbols are spun up. The more scatter symbols that are spun up, the more free games there may be constituting the feature.

The invention may be applicable to any feature. However, for ease of explanation, the invention will be described with reference to the feature being a series of free games. The non-monetary characteristics associated with the free games may include the number of free games constituting the feature as determined by the number of scatter symbols which triggered the feature and the multiplier which is applicable to any wins occurring in the free games of the feature.

As indicated above, the player may be offered the opportunity of varying at least one of the non-monetary characteristics of the feature. Preferably, in the case of a feature constituted by a series of free games, the player is offered the opportunity of varying the number of free games constituting the feature as well as the multiplier which is applicable to any wins won in a free game of the feature. The idea is that the player tries to improve the position for himself or herself by increasing the number of free games and the multiplier with no guarantee being provided that the player's position will be improved. In fact, the ability to vary the non-monetary characteristics may result in the player's position being worsened.

The player may be afforded more than one opportunity to vary each non-monetary characteristic. However, the controller may limit the number of attempts offered to the player to a certain maximum value or minimum value of the non-monetary characteristics. Instead, the player may be afforded a predetermined number of attempts to vary the non-monetary characteristics.

As specified above, one of the non-monetary characteristics is a jackpot category. Certain progressive jackpots have five levels being a mini jackpot, a minor jackpot, a grand jackpot, a major jackpot and a maxi jackpot. Thus, when the player has been awarded one of the lower jackpot categories, the player may be able to attempt to obtain a higher jackpot level.

Further, where the player is afforded the opportunity of varying more than one non-monetary characteristic, once the player has made a final determination regarding one of the non-monetary characteristics, that non-monetary characteristic may no longer be available for variation.

The ability to vary a non-monetary characteristic of the feature may be entirely at the discretion of the player. Accordingly, one of the options available to the player may be to select to play the feature with the non-monetary characteristics of that feature being as they were when the feature was triggered.

The selector may be a user interface. The user interface may be a touch screen of the display. In addition, or instead, the user interface may include one or more control buttons on a midtrim of the gaming machine.

According to a second aspect of the invention, there is provided a game to be played on a game playing apparatus, the game playing apparatus having a display and being controlled by a game controller arranged to control images displayed on the display, the game comprising a feature having non-monetary characteristics that can be won, the non-monetary characteristics being able to be gambled and a player being offered the opportunity to gamble at least one of the non-monetary characteristics of the feature at the commencement of the feature.

A game playing apparatus includes one which does not require the wagering of a stake in order to play the game and further includes apparatus which is connectable to a network.

BRIEF DESCRIPTION OF THE DRAWINGS

The invention is now described by way of example with reference to the accompanying diagrammatic drawings in which.

DETAILED DESCRIPTION OF THE DRAWINGS

Figure 1:
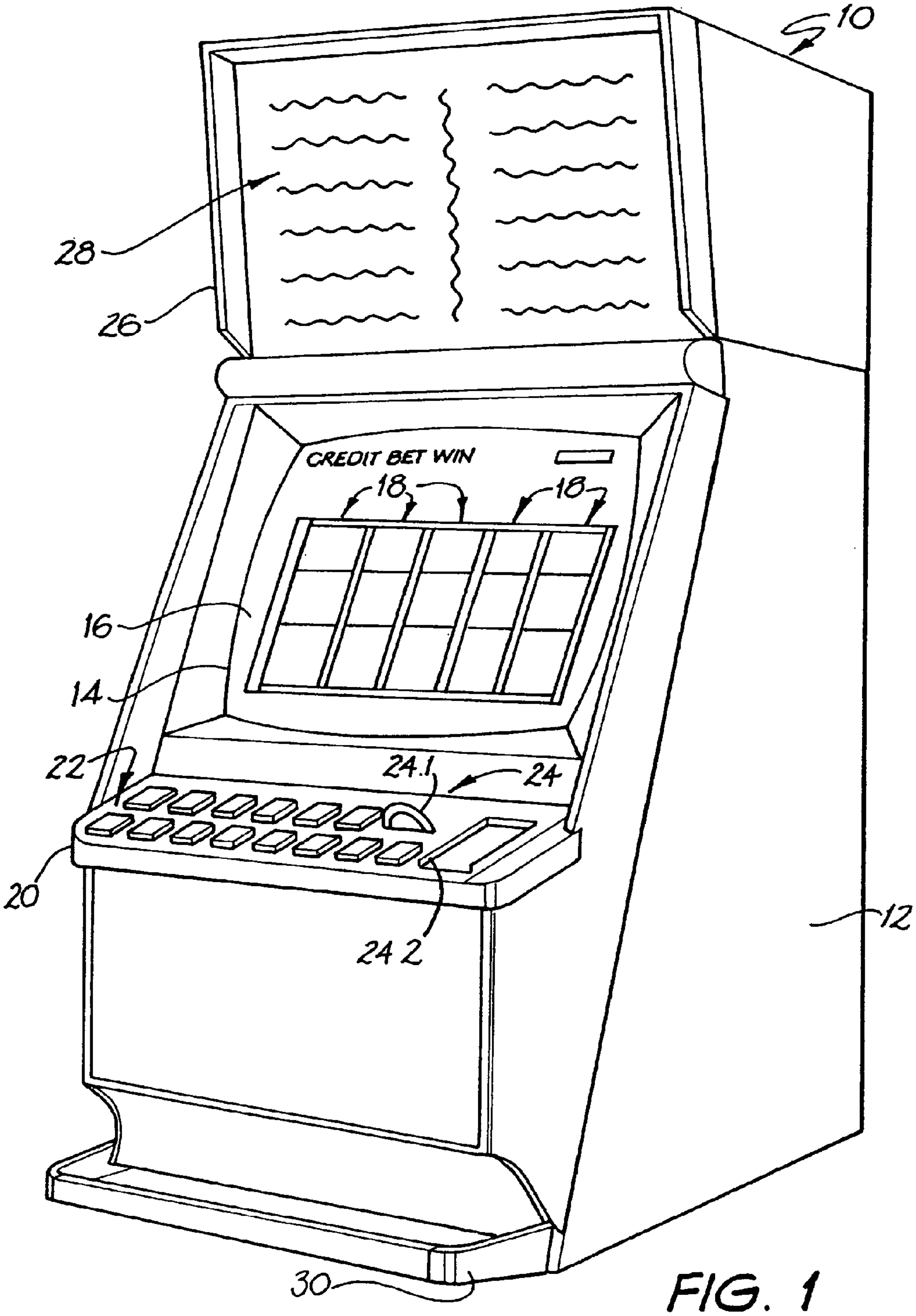
FIG. 1 shows a perspective view of a gaming machine, in accordance with the invention.

In FIG. 1, reference numeral 10 generally designates a gaming machine, including a game, in accordance with the invention. The machine 10 includes a console 12 having a display in the form of a video display unit 14 on which a game 16 is played, in use. The video display unit 14 may be implemented as a cathode ray screen device, a liquid crystal display, a plasma screen, or the like. The game 16 is a spinning reel game which simulates the rotation of a number of spinning reels 18. A midtrim 20 of the machine 10 houses a keypad 22 for enabling a player to play the game 16. The midtrim 20 also houses a credit input mechanism 24 including a coin input chute 24.1 and a bill collector 24.2.

The machine 10 includes a top box 26 on which artwork 28 is carried. The artwork 28 includes paytables, details of bonus awards, etc.

A coin tray 30 is mounted beneath the console 12 for cash payouts from the machine 10.

Figure 2:
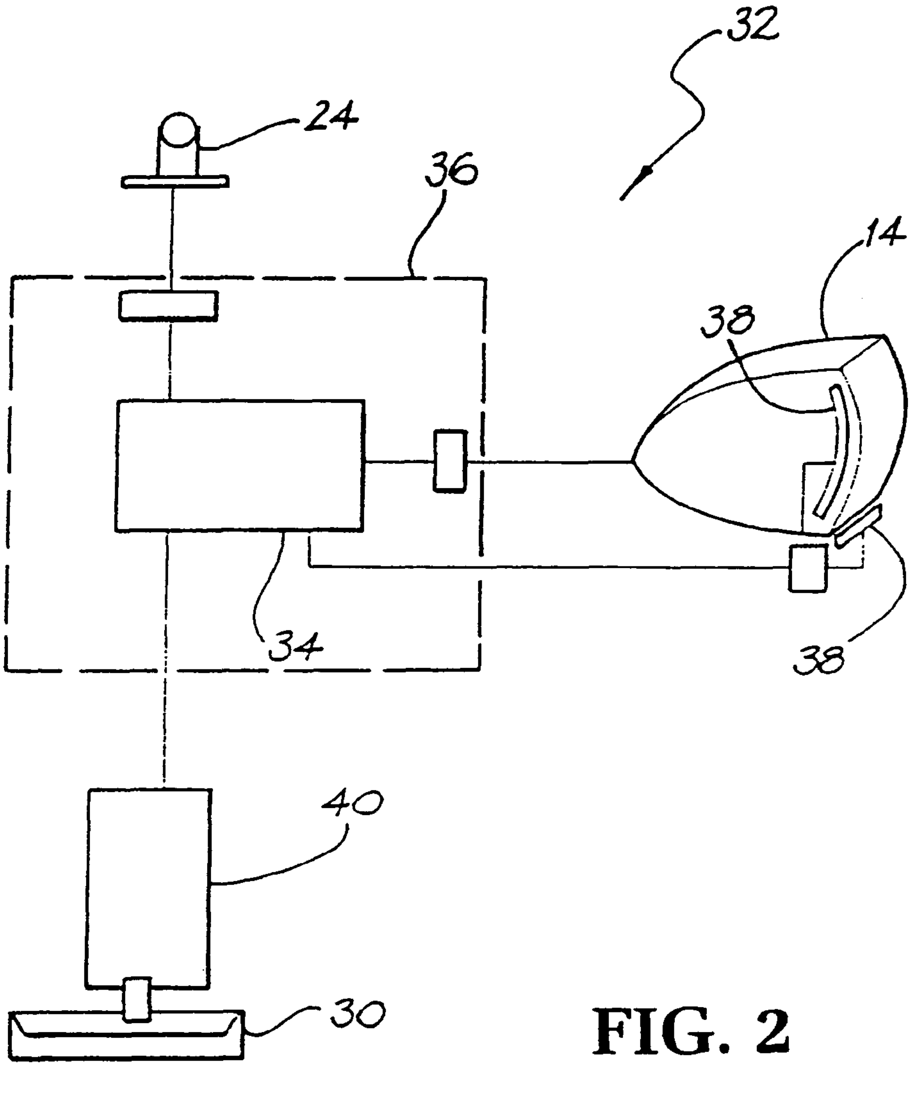
FIG. 2 shows a block diagram of a control circuit of the gaming machine.

Referring to FIG. 2 of the drawings, a control circuit 32 is illustrated. A program which implements the game and user interface is run on a processor 34 of the control circuit 32. The processor 34 forms part of a controller 36 that drives the screen of the video display unit 14 and that receives input signals from sensors 38. The sensors 38 include sensors associated with the bank 22 of buttons and touch sensors mounted in the screen of the video display unit 14. The controller 36 also receives input pulses from the mechanism 24 to determine whether or not a player has provided sufficient credit to commence playing. The mechanism 24 may, instead of the coin input chute 24.1 or the bill collector 24.2, or in addition thereto, be a credit card reader (not shown) or any other type of validation device.

Finally, the controller 36 drives a payout mechanism 40 which, for example, may be a coin hopper for feeding coins to the coin tray 30 to make a pay out to a player when the player wishes to redeem his or her credit.

Figure 3:
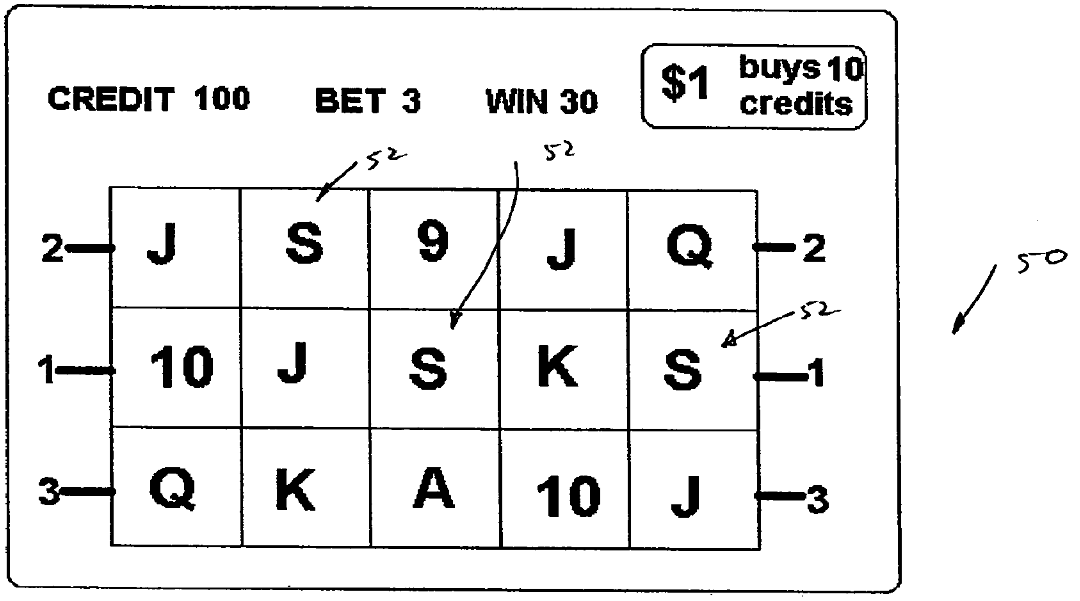
FIG. 3 shows a screen display of a result of a base game of a game played on the gaming machine of FIG. 1.
Figure 4:
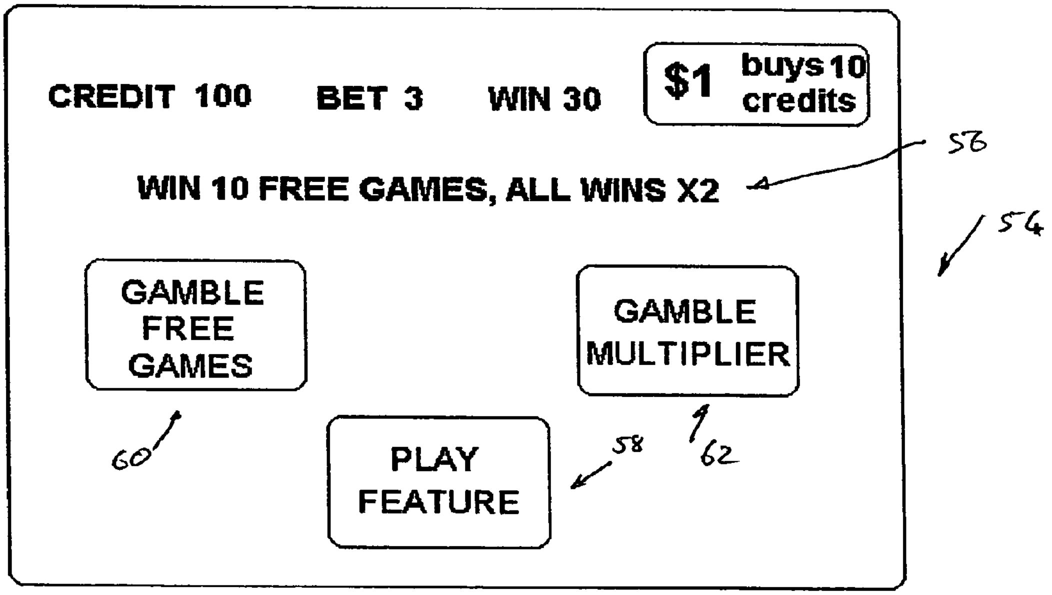
FIGS. 4 to 8 show a series of screen displays prior to commencement of a feature won in the base game.

Referring to FIG. 3 of the drawings, a screen display of the result of a base game of the game 16 is shown and is designated generally by the reference numeral 50.

The base game is a spinning reel game. Reel symbols of the base game (and, in this example, reel symbols of the free games of the feature) include a scatter symbol 52. When three or more scatter symbols 52 are spun up anywhere on the display, a feature is triggered.

Hence, as shown in FIG. 3 of the drawings, because three scatter symbols 52 have been spun up in the base game, the feature is triggered. The feature is a series of free games. The number of free games constituting the feature is dependent on the trigger condition. More particularly, the number of free games constituting the feature depends on the number of scatter symbols 52 which are spun up in the underlying base game. When three, four, or five scatter symbols are spun up, ten, fifteen or twenty free games, respectively, are awarded. In another embodiment of the invention, the number of free games awarded is independent of the number of scatter symbols 52 that occur in the base game. In other words, three or more scatter symbols 52 trigger a feature comprising fifteen free games with a multiplier of three applying to all wins.

Thus, arising from the result of the base game shown in FIG. 3, ten free games are awarded.

Prior to commencement of the feature, a second screen display 54 appears on the video display unit 14 of the gaming machine 10. The second screen display 54 firstly includes a message 56 notifying the player of the number of free games constituting the feature and the multiplier which will be applicable to any wins occurring in the free games of the feature.

In addition, three icons 58, 60 and 62 are displayed in the display 54. These icons 58, 60 and 62 are arranged behind a touch sensitive part of the screen of the video display unit 14. Thus, the screen serves as a user interface by means of which a player can make his or her selection.

By means of the icons 58, 60 and 62 the player can choose to play the feature or to gamble non-monetary characteristics associated with the feature, more particularly, the number of free games constituting the feature and/or gamble the multiplier applicable to the free games of the feature, respectively.

If the player selects the icon 58, i.e. the "Play Feature" icon, the feature is played with the non-monetary characteristics of that feature as they initially were when the feature was triggered. In other words, the feature will consist of ten free games in which all wins are multiplied by a multiplier of two.

As indicated by the icon 60 and 62, the player has the option of varying both non-monetary characteristics of the feature, being the number of free games constituting the feature and the multiplier which is applicable to wins occurring during any free game of the feature.

Figure 5:
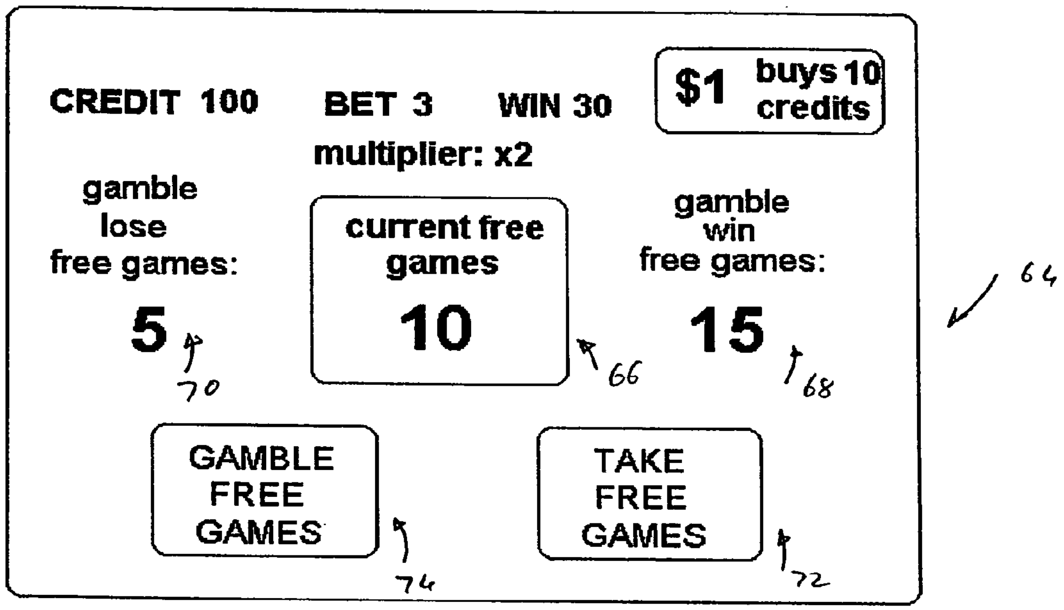

Assuming the player selects firstly to vary the number of free games, the player touches the icon 60. The screen display changes to that shown at 64 in FIG. 5 of the drawings. A central message 66 shows the number of free games. A further message 68 shows what the result will be if the player succeeds in improving his or her position and a message 70 shows what the player's position will be if the player's position is worsened as a result of losing the gamble.

If the player wishes to change his or her mind, the player can touch the screen over a message 72 and take the current free games, i.e. ten free games. If, however, the player wishes to gamble the free games, the player touches icon 74.

Figure 6:
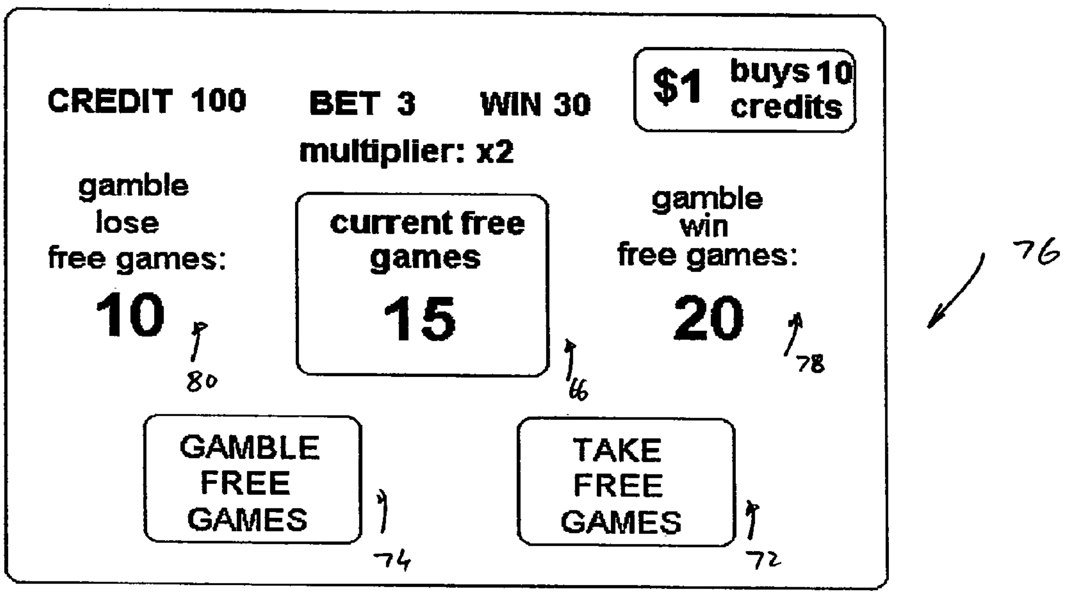

It is assumed that the player decides to gamble the free games and touches the icon 74. As a result of the player's gamble the player has a successful outcome and the result is shown on screen display 76 (FIG. 6 of the drawings). Once again, the player is afforded the opportunity of further gambling the free games by touching the icon 74 or the player can take the free games by touching the icon 72. Also, a message 78 is displayed illustrating what the player's position will be if the player improves his or her position by gambling the free games again. A further message 80 is displayed indicating what the player's position will be if the player loses the gamble should the player decide to gamble the free games again.

Figure 7:
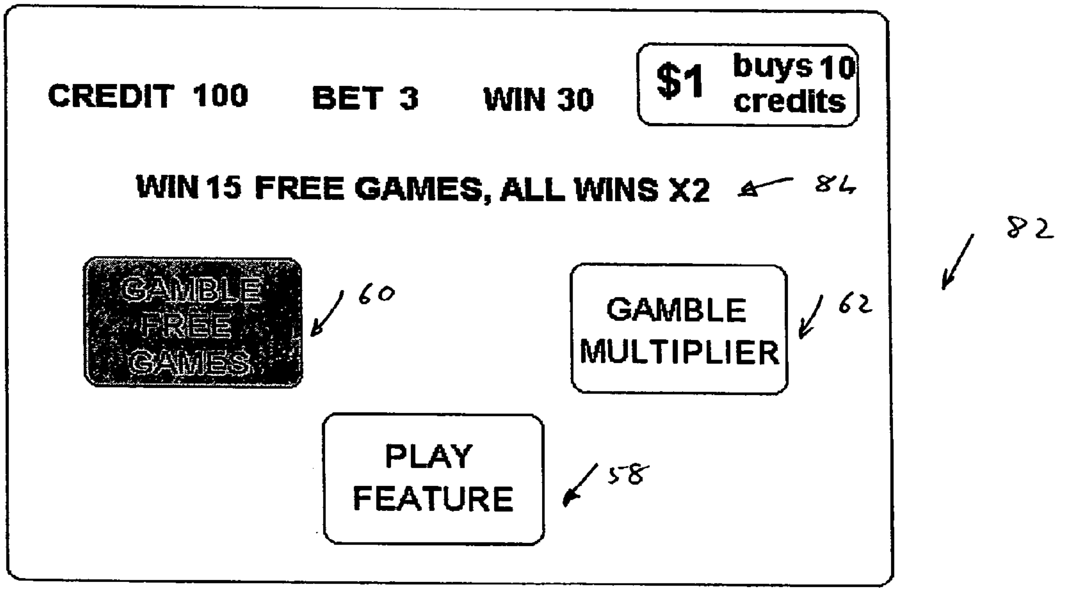

It is assumed that the player then decides to take the free games by touching the icon 72. As a result, a screen display 82, as shown in FIG. 7 of the drawings, is displayed. A message 84 is displayed showing that the player has won fifteen free games. At present, all wins are multiplied by two. The icon 60 is rendered inactive and this is shown by the icon 60 being greyed out so that the player can no longer select to gamble the free games. The icons 58 and 62 remain active.

Figure 8:
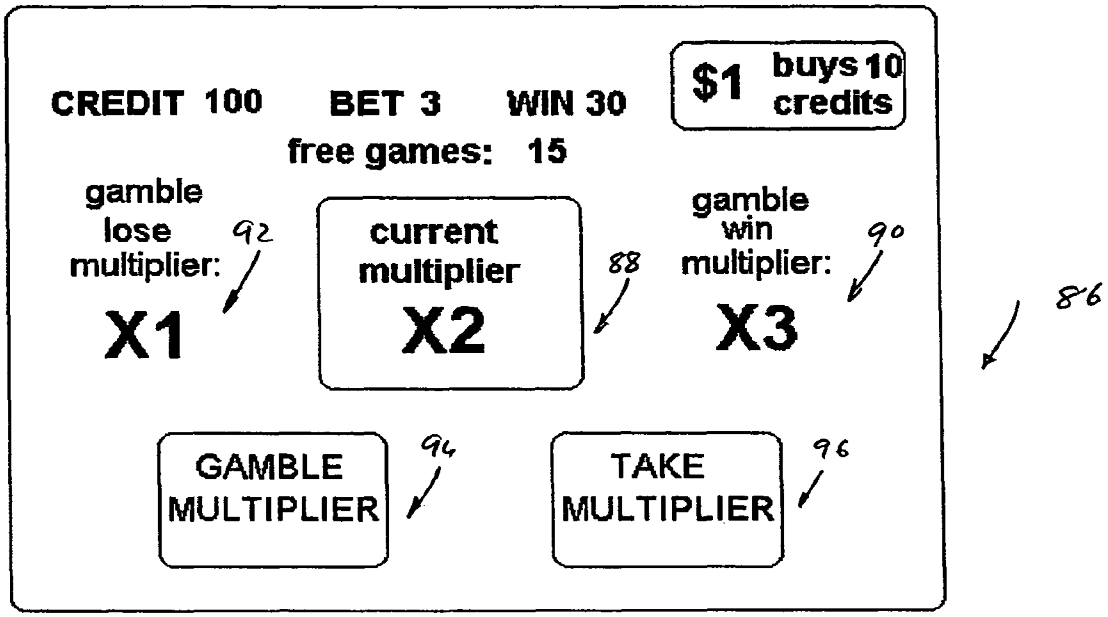
Figure 9:
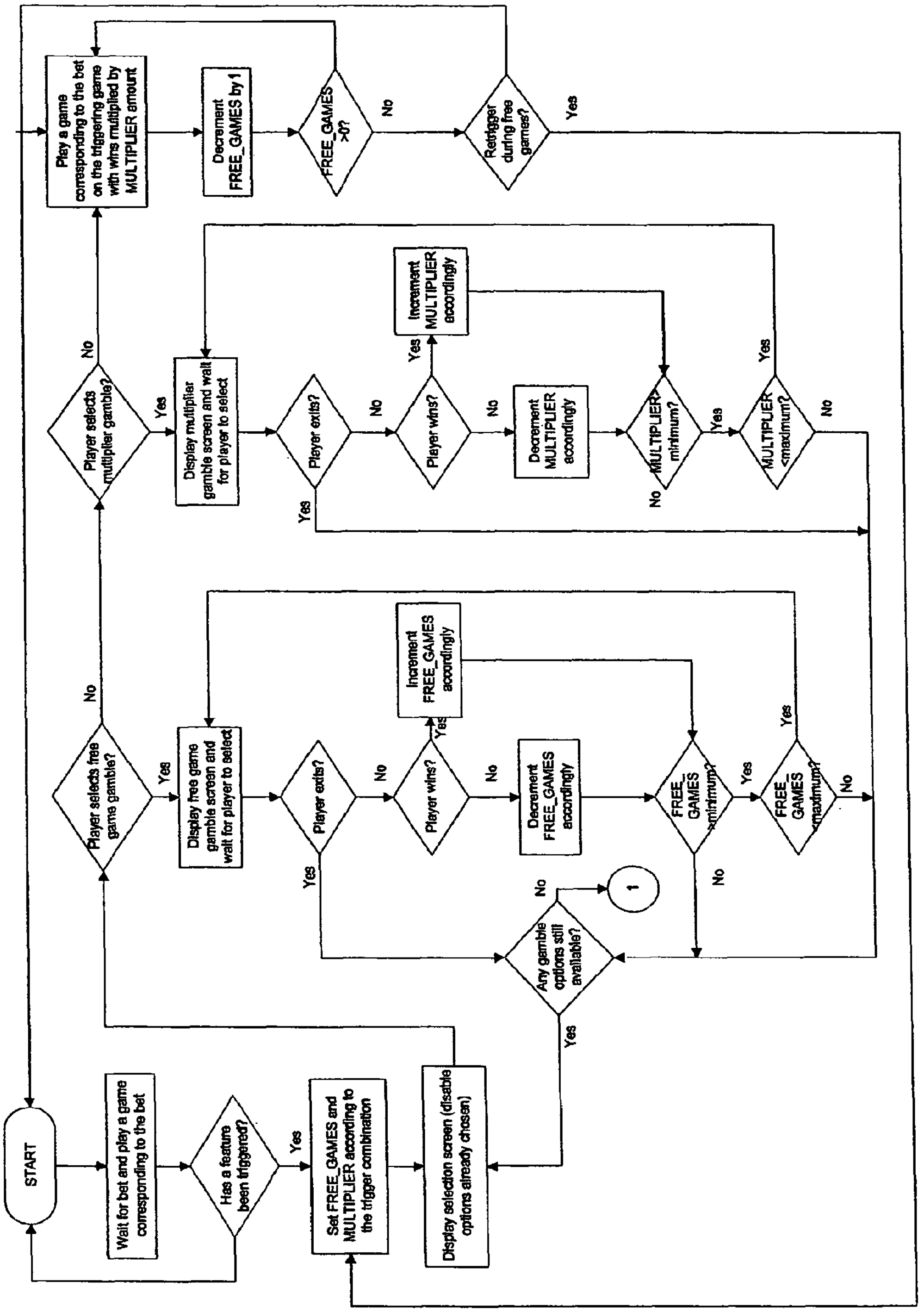
FIG. 9 shows a flow chart of the game played on the gaming machine of FIG. 1.

The player elects to gamble the multiplier by pressing the icon 62 and the screen display changes to that as shown at 86 in FIG. 8 of the drawings. The screen display shows, at 88, the current multiplier. It further shows a message 90 indicating what the position will be if the player successfully gambles the current multiplier. A message 92 indicates what the player's position will be if the player has an unsuccessful gamble with respect to the multiplier.

Two icons 94 and 96 are also displayed allowing the player either to gamble the multiplier or to take the present multiplier, respectively. Thus, the player is afforded another opportunity to take the current multiplier.

Both in respect of the number of free games and in respect of the value of the multiplier, the player may be offered a limited number of gambles and/or a maximum and minimum number of free games or multiplier that may be awarded.

Preferably, the player can gamble up to a maximum of twenty-five free games or down to a minimum of five free games before the player is compelled to take the free game gamble.

Similarly, in respect of the multiplier, the player can gamble up to a maximum multiplier value of ten or a minimum multiplier value of one before being compelled to take the multiplier gamble.

Once the number of free games and multiplier have been finalised, the screen display 50 will return and, to commence the feature, the player presses a "Start Feature" button on the keypad 22.

If the trigger combination occurs again during any one of the free games then, after the completion of the free games currently being played, the player will again be afforded the option of gambling the number of free games and the multiplier for the re-triggered series of free games.

Accordingly, it is an advantage of the invention that a gaming machine 10 and game 16 are provided which will enhance player interest. Players can gamble non-monetary characteristics associated with the feature in order to attempt to improve their position. In so doing, the player's involvement in the game 16 is enhanced resulting in greater player enjoyment.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The claims defining the invention are as follows:

1. A method of playing a base game on a gaming machine, comprising:

displaying at least one random event on a display of the gaming machine in response to play of the base game on the gaming machine;

determining, with the gaming machine, whether a predefined winning event occurred based upon the at least one random event;

awarding a jackpot category for a subsequent feature game in response to determining that the predefined winning event occurred;

permitting the jackpot category to be gambled for a chance to enhance the jackpot category of the subsequent feature game;

offering more than one attempt to enhance the jackpot category for the subsequent feature game; and limiting the number of attempts based upon whether a maximum jackpot category has been reached.

2. The method of claim 1, wherein said awarding comprises selecting the jackpot category from a plurality of jackpot categories that include at least one lower and at least one higher jackpot category than the selected jackpot category.

3. The method of claim 1, further comprising increasing the jackpot category in response to a successful gamble.

4. The method of claim 1, further comprising decreasing the jackpot category in response to an unsuccessful gamble.

5. A non-transitory computer readable medium, comprising a program, that in response to being executed, results in a gaming machine:

displaying at least one random event on a display in response to play of a base game;

determining whether a predefined winning event occurred based upon the at least one random event;

awarding a jackpot category for a subsequent feature game in response to determining that the predefined winning event occurred;

permitting the jackpot category to be gambled for a chance to enhance the jackpot category of the subsequent feature game;

offering more than one attempt to enhance the jackpot category for the subsequent feature game; and limiting the number of attempts based upon whether a maximum jackpot category has been reached.

6. The non-transitory computer readable medium of claim 5, wherein the program, in response to being executed, further results in a gaming machine selecting the jackpot category from a plurality of jackpot categories that include at least one lower and at least one higher jackpot category than the selected jackpot category.

7. The non-transitory computer readable medium of claim 5, wherein the program, in response to being executed, further results in a gaming machine increasing the jackpot category in response to a successful gamble.

8. The non-transitory computer readable medium of claim 5, wherein the program, in response to being executed, further results in a gaming machine decreasing the jackpot category in response to an unsuccessful gamble.

9. A gaming machine, comprising:

a display; and a game controller configured to generate at least one random event on the display in response to play of a base game, determine whether a predefined winning event occurred based upon the at least one random event, award a jackpot category for a subsequent feature game in response to determining that the predefined winning event occurred; and permit the jackpot category to be gambled for a chance to enhance the jackpot category of the subsequent feature game, wherein the game controller is further configured to offer more than one attempt to enhance the jackpot category for the subsequent feature game, and limit the number of attempts based upon whether a maximum jackpot category of the plurality of jackpot categories has been reached.

10. The gaming machine of claim 9, wherein the game controller is further configured to select the jackpot category from a plurality of jackpot categories that include at least one lower and at least one higher jackpot category than the selected jackpot category.

11. The gaming machine of claim 9, wherein the game controller is further configured to increase the jackpot category in response to a successful gamble.

12. The gaming machine of claim 9, wherein the game controller is further configured to decrease the jackpot category in response to an unsuccessful gamble.

* * * * *